United States Patent
Bannenberg et al.

(10) Patent No.: US 12,254,415 B2
(45) Date of Patent: Mar. 18, 2025

(54) COMPUTER-IMPLEMENTED METHOD AND TEST UNIT FOR APPROXIMATING A SUBSET OF TEST RESULTS

(71) Applicant: dSPACE GmbH, Paderborn (DE)

(72) Inventors: Sebastian Bannenberg, Paderborn (DE); Fabian Lorenz, Paderborn (DE); Rainer Rasche, Paderborn (DE)

(73) Assignee: dSPACE GMBH, Paderborn (DE)

( * ) Notice: Subject to any disclaimer, the term of this patent is extended or adjusted under 35 U.S.C. 154(b) by 285 days.

(21) Appl. No.: 17/559,828

(22) Filed: Dec. 22, 2021

(65) Prior Publication Data
US 2022/0138094 A1 May 5, 2022

Related U.S. Application Data

(63) Continuation of application No. PCT/EP2020/073062, filed on Aug. 18, 2020.

(30) Foreign Application Priority Data

Aug. 21, 2019 (DE) ...................... 10 2019 122 414.4
Aug. 21, 2019 (EP) ...................... 19192741
Aug. 21, 2019 (EP) ...................... 19192743

(51) Int. Cl.
*G06N 3/088* (2023.01)
*B60W 50/06* (2006.01)
(Continued)

(52) U.S. Cl.
CPC ............. *G06N 3/088* (2013.01); *B60W 50/06* (2013.01); *B60W 60/00* (2020.02);
(Continued)

(58) Field of Classification Search
CPC ..... B60W 50/06; B60W 60/00; G05B 13/027; G06F 11/3664; G06F 11/3688;
(Continued)

(56) References Cited

U.S. PATENT DOCUMENTS

2016/0371811 A1* 12/2016 Siegel .................. H04N 19/587
2017/0261947 A1   9/2017 Koga
(Continued)

FOREIGN PATENT DOCUMENTS

CN  106842925 A  6/2017
CN  107169567 A  9/2017
(Continued)

OTHER PUBLICATIONS

Abdessalem et al., "Testing Advanced Driver Assistance Systems using Multi-objective Search and Neural Networks", ASE, pp. 63-74, (Sep. 3-7, 2016).
(Continued)

*Primary Examiner* — Babar Sarwar
(74) *Attorney, Agent, or Firm* — Muncy, Geissler, Olds & Lowe, P.C.

(57) ABSTRACT

The invention relates to a computer-implemented method for approximating a subset of test results of a virtual test of a device for the at least partially autonomous guidance of a motor vehicle. The invention further relates to a test unit for approximating a subset of test results of a virtual test of a device for the at least partially autonomous guidance of a motor vehicle. The invention also relates to a computer program and a computer-readable data carrier.

14 Claims, 5 Drawing Sheets

(51) Int. Cl.
*B60W 60/00* (2020.01)
*G05B 13/02* (2006.01)
*G06F 11/36* (2006.01)
*G06F 11/3668* (2025.01)
*G06N 3/045* (2023.01)
*G06N 3/08* (2023.01)

(52) U.S. Cl.
CPC ........ *G05B 13/027* (2013.01); *G06F 11/3664* (2013.01); *G06F 11/3688* (2013.01); *G06F 11/3692* (2013.01); *G06N 3/045* (2023.01); *G06N 3/08* (2013.01)

(58) Field of Classification Search
CPC .... G06F 11/3692; G06N 3/045; G06N 3/047; G06N 3/048; G06N 3/08; G06N 3/082; G06N 3/088
See application file for complete search history.

(56) References Cited

U.S. PATENT DOCUMENTS

| | | | |
|---|---|---|---|
| 2018/0174042 A1 | 6/2018 | Srinivasa et al. | |
| 2018/0336436 A1* | 11/2018 | Cheng | G06F 18/2433 |
| 2018/0336439 A1* | 11/2018 | Kliger | G06N 3/088 |
| 2018/0336471 A1* | 11/2018 | Rezagholizadeh | G06N 3/047 |
| 2019/0018415 A1 | 1/2019 | Netter | |
| 2019/0130278 A1* | 5/2019 | Karras | G06V 10/82 |
| 2019/0259153 A1* | 8/2019 | Zhang | G06N 3/047 |
| 2020/0134494 A1* | 4/2020 | Venkatadri | G06N 3/045 |
| 2020/0192359 A1* | 6/2020 | Aragon | G05D 1/0061 |
| 2021/0197720 A1* | 7/2021 | Houston | G06N 3/045 |

FOREIGN PATENT DOCUMENTS

| | | | |
|---|---|---|---|
| CN | 109634120 A | | 4/2019 |
| DE | 10 2016 208 076 A1 | | 11/2017 |
| DE | 102017200180 A1 | * | 7/2018 |
| DE | 10 2018 200 816 B3 | | 2/2019 |
| DE | 10 2018 112 929 A1 | | 7/2019 |
| EP | 3319016 A1 | | 5/2018 |
| EP | 3 340 123 A1 | | 6/2018 |
| EP | 3 365 741 A1 | | 8/2018 |
| EP | 3 404 586 A1 | | 11/2018 |

OTHER PUBLICATIONS

Goodfellow et al., "Generative Adversarial Nets", arXiv: 1406.2661v1, pp. 1-9 (Jun. 10, 2014).

Yuchi et al., "DeepTest: Automated Testing of Deep-Neural-Network-driven Autonomous Cars", arXiv: 1708.08559v1, pp. 1-12 (Aug. 28, 2017).

Luo et al., "Model predictive control for adaptive cruise control with multi-objectives: comfort, fuel-economy, safety and car-following," J. of Zhejiang Univ. Sci A, vol. 3, pp. 191-201 (Nov. 2010).

Holzmann et al., "Representation of 3-D Mappings for Automotive Control Applications using Neural Networks and Fuzzy Logic," Proc. of IEEE Int'l Conf on Control Apps, pp. 229-234 (Oct. 5-7, 1997).

Li et al., "Model Predictive Multi-Objective Vehicular Adaptive Cruise Control," IEEE Trans. on Control Systems, vol. 19, No. 3, pp. 556-566 (May 3, 2011).

Jun Li et al., "Survey on Artificial Intelligence for Vehicles," Automotive Innovations, vol. 1, pp. 2-14 (2018).

U.S. Appl. No. 16/999,533, filed Aug. 21, 2020.

U.S. Appl. No. 17/559,716, filed Dec. 22, 2021.

Thesis for Chinese Patent Application No. 202080047817.8 mailed on Dec. 16, 2024.

Office Action for Chinese Patent Application No. 202080047817.8 mailed on Dec. 24, 2024.

* cited by examiner

COMPUTER-IMPLEMENTED METHOD AND TEST UNIT FOR APPROXIMATING A SUBSET OF TEST RESULTS

This nonprovisional application is a continuation of International Application No. PCT/EP2020/073062, filed on Aug. 18, 2020, which claims priority under 35 U.S.C. § 119(a) to European Patent Application No. 19192741.7, which was filed in Europe on Aug. 21, 2019, German Patent Application No. 10 2019 122 414.4 which was filed in Germany on Aug. 21, 2019, and European Patent Application No. 19192743.3 which was filed in Europe on Aug. 21, 2019, and which are all herein incorporated by reference.

BACKGROUND OF THE INVENTION

Field of the Invention

The present invention relates to a computer-implemented method for approximating a subset of test results of a virtual test of a device for the at least partially autonomous guidance of a motor vehicle.

The present invention further relates to a test unit for identifying a subset of test results of a virtual test of a device for the at least partially autonomous guidance of a motor vehicle. The present invention further relates to a computer program and a computer-readable data carrier.

Description of the Background Art

Driving assistance systems such as an adaptive cruise control and/or highly automated driving functions can be verified and validated using a variety of verification methods. In particular, hardware-in-the-loop methods, software-in-the-loop methods, simulations and/or test drives can be used.

The outlay, in particular time and/or cost, for testing such vehicle functions using the above-mentioned verification methods is typically very extensive, since a large number of potentially possible driving situations must be tested.

This can lead in particular to a high expenditure for test-drives as well as for simulations. DE 10 2017 200 180 A1 specifies a method for verifying and/or validating a vehicle function, which is intended to autonomously guide a vehicle in the longitudinal and/or transverse direction.

Based on environmental data relating to an environment of the vehicle, the method includes determining a test control instruction of the vehicle function to an actuator of the vehicle, wherein the test control instruction is not implemented by the actuator.

Based on environmental data and using a road user model with respect to at least one road user in the environment of the vehicle, the method further comprises simulating a fictitious traffic situation that would be present if the test control instruction had been implemented.

The method further comprises providing test data relating to the fictitious traffic situation. The vehicle function is operated passively in the vehicle to determine the test control instruction.

A disadvantage of this method is that for the verification and/or validation of the vehicle function, actual operation of the vehicle is required for determining the required data.

Accordingly, there is a need to improve existing methods and testing equipment so that so-called critical test cases can be efficiently determined in the context of scenario-based testing of systems and system components in highly automated driving.

SUMMARY OF THE INVENTION

It is therefore an object of the present invention to provide a method, a test unit, a computer program and a computer-readable data carrier which can determine critical test cases in the context of scenario-based testing for systems and system components in highly automated driving in an efficient manner.

The object is achieved according to the invention by a computer-implemented method for approximating a subset of test results of a virtual test of a device for the at least partially autonomous guidance of a motor vehicle, a test unit for identifying a subset of test results of a virtual test of a device for the at least partially autonomous guidance of a motor vehicle, a computer program and a computer-readable data carrier.

The invention relates to a computer-implemented method for approximating a subset of test results of a virtual test of a device for the at least partially autonomous guidance of a motor vehicle.

The method comprises providing a data set defining a state space, wherein each state is formed by a parameter set of driving situation parameters for which state one or more actions are feasible in order to attain another parameter set from the parameter set, wherein each parameter set has at least one environmental parameter describing the environment of the motor vehicle and at least one EGO parameter describing the state of the motor vehicle.

The attainment of another parameter set in the state space can be understood here as determining the further parameter set.

The method further comprises performing an approximation step in which a function value of at least one further parameter set is approximated using an artificial neural network, wherein if the function value of the approximated at least one further parameter set is greater than or equal to a predefined threshold value, the at least one further parameter set is identified as for determining the required data the subset of test results.

If the function value of the at least one further parameter set is less than the predefined threshold value, the artificial neural network performs at least one further approximation step starting from the respectively last further parameter set until the function value of a further parameter set is greater than or equal to the predefined threshold value.

In the context of the present method, therefore, an artificial neural network is advantageously used, which has the object of approximating a subset of test results. This subset of test results is critical test results of interest, which are the subject of virtual tests of a device, such as a control unit, for the autonomous guidance of a motor vehicle.

In scenario-based testing of systems and system components for the autonomous guidance of a motor vehicle, scenarios are defined which can be described as the abstraction of a traffic situation. A logical scenario here is the abstraction of a traffic situation with the road, the driving behavior and the surrounding traffic without concrete parameter values.

By choosing concrete parameter values, the logical scenario becomes a concrete scenario. Such a concrete scenario corresponds to a particular traffic situation.

An autonomous driving function is realized by a system, for example a control unit. The control unit is conventionally tested in the real vehicle in real traffic situations or alternatively validated by virtual tests.

The present method in this context approximates critical test results or traffic situations, i.e., the subset of the total test results, which are considered critical. Critical test cases are, for example, all parameter combinations of specific driving situation parameters that lead to critical driving situations such as a vehicle collision or a near-vehicle collision.

So that an unnecessary number of parameter combinations and traffic situations do not have to be tested by conventional simulation methods, in the context of the present method the abovementioned subsets of test results which correspond to the critical test cases are approximated by an artificial neural network.

The test results approximated in this way can then be advantageously validated in the context of virtual tests of the control unit, so that a more efficient virtual validation of control units for the autonomous guidance of motor vehicles is possible by the method according to the invention.

The invention thus defines by the definition of the predetermined threshold value when the approximated test results can be identified as associated with the desired subset.

The method is designed such that it carries out an arbitrary number of approximation steps until an identification of relevant parameter sets of driving situation parameters is given, which are associated with the subset of test results of interest.

According to an aspect of the invention, the method according to the invention further comprises selecting a startup parameter set from the plurality of parameter sets of the driving situation parameters, wherein in the approximating step, the function value of each adjacent parameter set attainable by the startup parameter set by an action is approximated using the artificial neural network, wherein a selection step is performed in which the parameter set is selected that is approximated with a lowest or highest function value in the approximation step.

If the function value of the selected parameter set is less than the predefined threshold value, at least one further selection step can be carried out starting from the respectively last selected parameter set until the function value of a selected parameter set is greater than or equal to the predetermined threshold value.

The present method employs a reinforcement learning method for identifying critical test cases. In contrast to supervised learning using an artificial neural network, reinforcement learning does not train with given training data. Instead, there are two parties to reinforcement learning: the network, commonly referred to as the agent, and the environment. The environment can also be viewed as a game area from which the current state or position of the agent is read out.

The network performs an action based on the current state. This action changes the state of the environment. From the environment, the network receives the new state and a reward of the action taken.

The goal is to achieve the best possible reward that is to maximize the reward. Consequently, in the learning process, the weightings of the neural network are adjusted based on the reward of the move made, and a new action is taken. By gradually adjusting the weightings, the network learns to perform the best possible action, i.e., a strategy, to get the best possible reward. Analogously, the reward can also be minimized by simple adaptation if a minimum is to be achieved.

One possibility for identifying critical test cases is the Q-learning principle, in which all possible actions and their rewards are considered starting from a state. The action with the highest return is selected and executed. For large state and action spaces as in the present case, the Q-function is realized as a neural network. Such a network is called DQN (Deep Q-Network). The neural network approximates the Q function.

According to a further aspect of the invention, the method according to the invention furthermore comprises that the plurality of parameter sets of driving situation parameters are generated by the artificial neural network or by a simulation. The parameter sets of driving situation parameters can thus be generated in a simple manner, for example when using an artificial neural network by using a random function within a predetermined definition range.

Moreover, the inventive method comprises that the artificial neural network has four hidden layers each with 128-neurons and an ELU activation function, and wherein a factor $\gamma$ of 0.8 is used to attenuate the function value of the further approximation steps.

The critical test results are approximated in such a way that in each training step, the artificial neural network receives the current position as input and approximates the function values or Q values for the neighboring positions.

Based on the highest return, the best neighbor position is determined. The current position is changed to this one. The training of the network therefore comprises the network predicting the Q-values of the neighboring positions on the basis of a received position. The highest Q value is used to select the neighboring position to which to move. The Q value or function value of this position is attenuated by the attenuation factor $\gamma$.

In order to determine the return, the direct return of the position is added to the weakened Q value. As desired values for the neural network, for determining the error and for updating the weightings, for example, a target value of 0 is specified for all positions except for the selected neighboring position. The determined return is indicated for the selected neighboring position.

According to a further aspect of the invention, the method according to the invention further comprises the step of selecting a startup parameter set from the plurality of parameter sets of the driving situation parameters, wherein if the functional value of the further parameter set is less than the predefined threshold value, another artificial neural network rewards the further parameter set approximated by the artificial neural network.

The further artificial neural network then adjusts the artificial neural network based on the reward. The artificial neural network adjusted in this way carries out at least one further approximation step on the basis of the respectively last approximated further parameter set until the function value of a further parameter set is greater than or equal to the predetermined threshold value.

The above method is an Actor-Critic method. There are two parties in an Actor-Critic model, the actor and the critic. As in Q-Learning, the actor receives a state and performs an action based on the state. In contrast to Q-Learning, no discretization is required in this method, so the action can be selected from a continuous number of actions. The states also need not be discretized.

The critic rewards the action of the actor. For this he needs the reward from the environment and the new state. By approximating the reward, the critic learns to predict the reward of actions. By updating the critic, the actor is adjusted. For example, the training of the actor and the critic is carried out simultaneously.

The critic receives the state, as well as the reward of the environment, which serves as a target value. Based on the target value and the actual value determined by the critic, the error can be calculated. With the aid of backpropagation, the critic is updated. The peculiarity of the training of the actor is that the detected error of the critic is used to update the actor by means of backpropagation.

The method further comprises that the artificial neural network has four hidden layers each having 256 neurons and having a PReLU activation function, wherein the further artificial neural network has four hidden layers each having 256 neurons and having an ELU activation function, and wherein the artificial neural network and the further artificial neural network employ the Adam optimization method.

According to a further aspect of the invention, the method further comprises that the EGO parameters include a speed of the motor vehicle and the environmental parameters include a speed of another motor vehicle and a distance between the motor vehicle and the further motor vehicle.

Using these parameters, for example, a so-called cut-in scenario can be approximated. The cut-in scenario can be described as a traffic situation in which a highly automated or autonomous vehicle travels in a predetermined lane and another vehicle traveling at a lower speed as compared to the EGO vehicle cuts into the lane of the EGO vehicle from another lane at a certain distance.

The speed of the EGO vehicle and the other vehicle, which is also referred to as a FELLOW vehicle, is constant. Since the speed of the EGO vehicle is greater than that of the FELLOW, the EGO vehicle must decelerate in order to avoid a collision of the two vehicles.

On the basis of the aforementioned EGO parameters and environmental parameters, critical traffic situations can thus be approximated by the method according to the invention in a predetermined definition range of the aforementioned parameters.

The method also further comprises that the function underlying the function value is a safety target function having a numerical value which given a safety distance of $\geq V_{FELLOW} \times 0.55$ between the motor vehicle and the other motor vehicle has a minimum value, in a collision between the motor vehicle and the further motor vehicle has a maximum value, and at a safety distance of $\leq V_{FELLOW} \times 0.55$ between the motor vehicle and the other motor vehicle has a numerical value which is greater than the minimum value.

The safety target function indicates how safe the traffic situation is for the EGO vehicle. It is specified as follows: If the distance between the EGO vehicle and the FELLOW vehicle is always greater than or equal to the safety distance, the functional value of the safety target function is 0.

The safety distance can be defined as a distance at which, as a function of the speed difference between the EGO vehicle and the FELLOW vehicle as well as the distance between the EGO vehicle and the FELLOW vehicle, the EGO vehicle is always able to safely brake without colliding with the FELLOW vehicle.

Such a distance is defined in the present example by a value in meters, which corresponds to the speed $V_{FELLOW} \times 0.55$.

The smaller the distance between the EGO vehicle and the FELLOW vehicle, or once the distance falls below the safety distance, the target function value increases more and more to the value of 1. Accordingly, if there is a collision between the EGO vehicle and the FELLOW vehicle, the distance between the EGO vehicle and the FELLOW vehicle is less than or equal to zero, and the target function value is 1.

The method according to the invention also provides that the function underlying the function value is a comfort target function or an energy consumption target function having a numerical value which has a minimum value in the event of no change in the acceleration of the motor vehicle, has a maximum value in a collision between the motor vehicle and the further motor vehicle, and has a numerical value between the minimum value and the maximum value when the acceleration of the motor vehicle changes as a function of the magnitude of the change in the acceleration.

With the aid of the comfort target function, assessments can be made about how pleasant a driving maneuver is for the driver of the EGO vehicle. Great acceleration or deceleration and frequent repetition of these operations are considered to be not comfortable.

The change in acceleration is called a jerk. The driving situation is the more comfortable the smaller the calculated value of the comfort target function.

The fuel consumption is 1 in the event of a collision between the EGO vehicle and the FELLOW vehicle, i.e., the fuel consumption is set to a specified maximum value. The reason for this is that the tank of gas of a vehicle cannot be reused in an accident.

As regards to the cut-in scenario, there are thus possible critical test cases at the boundary between collision and non-collision cases, which can be defined on the basis of the respective target functions, i.e., the safety target function, the comfort target function and the energy consumption target function.

The method also comprises that the plurality of driving situation parameters, in particular the speed of the motor vehicle and the speed of the further motor vehicle, are generated within a predetermined definition range by a random algorithm. Thus, the plurality of driving situation parameters constituting the data set used to approximate critical test results can be easily and time-efficiently generated.

The method can further comprise that a separate artificial neural network is used for approximating the numerical value range of each function underlying the function value, wherein individual hyperparameters of each artificial neural network are stored in a database.

The use of a separate artificial neural network to approximate the numerical value range of each individual target function, i.e., the safety target function, the comfort target function and/or the energy consumption target function, advantageously enables a more accurate approximation result.

A test unit can be provided for identifying a subset of test results of a virtual test of a device for the at least partially autonomous guidance of the motor vehicle.

The test unit can provide a data set defining a state space, each state being formed by a parameter set of driving situation parameters for which state one or more actions are feasible to attain another set of parameters from the parameter set, wherein each parameter set has at least one environmental parameter describing the environment of the motor vehicle and at least one EGO parameter describing the state of the motor vehicle.

The test unit furthermore can comprise an artificial neural network which performs an approximation step in which a function value of at least one further parameter set can be approximated, wherein if the function value of the approximated at least one further parameter set is greater than or equal to a predefined threshold value, the at least one further parameter set is identifiable as associated with the subset of test results.

If the function value of the at least one further parameter set is less than the predefined threshold value, the artificial neural network is configured to perform at least one further approximation step starting from the respectively last approximated further parameter set until the function value of another parameter set is greater than or equal to the predetermined threshold value.

In the context of the present test unit, therefore, an artificial neural network is advantageously used which has the object of approximating a subset of test results, namely critical test results of interest.

The test results approximated in this way can then be advantageously validated in the context of virtual tests of the control unit so that more efficient virtual validation of control units for the autonomous guidance of motor vehicles is possible by the test unit according to the invention.

In accordance with a further aspect of the invention, a control unit embodies the device, and wherein a driving situation underlying the approximation of the test results of the virtual test of the control unit is a lane change of another motor vehicle into a lane of the motor vehicle using the plurality of driving situation parameters.

The test unit is thus advantageously able to approximate corresponding test results of the virtual test with regard to, for example, a cut-in scenario.

A computer program with a program code is also provided in order to carry out the method according to the invention when the computer program is executed on a computer.

A data carrier with a program code of a computer program is provided in order to carry out the method according to the invention when the computer program is executed on a computer.

The features of the method described herein can be used for approximating critical test results of a variety of different scenarios or driving situations. Likewise, the test unit according to the invention is suitable for testing a multitude of different devices or control units of, for example, automobiles, trucks and/or commercial vehicles, ships or aircraft in terms of approximating critical test results.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
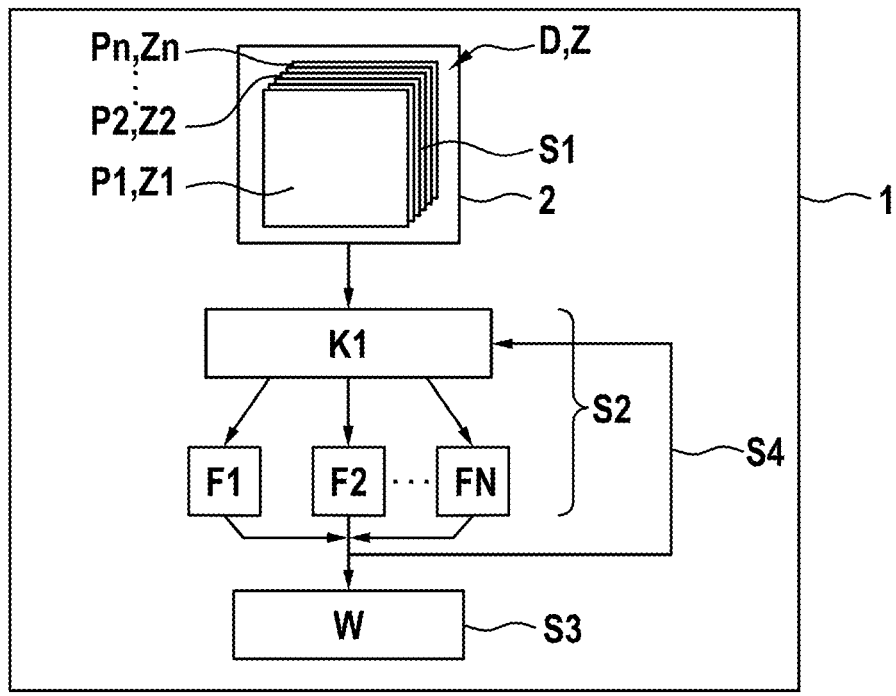
FIG. 1 is a flow chart of the method for approximating a subset of test results of a virtual test of a device for the at least partially autonomous guidance of a motor vehicle according to an example of the invention.

FIG. 1 shows a flow chart of the method for approximating a subset of test results of a virtual test of a device for the at least partially autonomous guidance of a motor vehicle according to a preferred embodiment of the invention.

The method comprises the provision 51 of a data set D defining a state space Z. Each state $Z1, Z2 \ldots Zn$ is formed by a parameter set $P1, P2 \ldots Pn$ of driving situation parameters. For the respective state $Z1, Z2 \ldots Zn$, one or more actions can be carried out in order to attain a further parameter set $P1, P2 \ldots Pn$ from the parameter set $P1, P2 \ldots Pn$, wherein each parameter set $P1, P2 \ldots Pn$ has at least one environmental parameter describing the environment of the motor vehicle and at least one EGO parameter describing the state of a motor vehicle.

The method further comprises performing an approximation step S2, in which a function value $F1, F2 \ldots Fn$ of at least one further parameter set $P1, P2 \ldots Pn$ is approximated using an artificial neural network K1.

If the function value $F1, F2 \ldots Fn$ of the approximated at least one further parameter set $P1, P2 \ldots Pn$ is greater than or equal to a predefined threshold value W, the at least one further parameter set $P1, P2 \ldots Pn$ is identified as associated with the subset of test results (S3).

If the function value $F1, F2 \ldots Fn$ of the at least one further parameter set $P1, P2 \ldots Pn$ is less than the predefined threshold value W, the artificial neural network K1 executes at least one further approximation step S4 on the basis of the respectively last approximated further parameter set $P1, P2 \ldots Pn$, until the function value $F1, F2 \ldots Fn$ of a further parameter set $P1, P2 \ldots Pn$ is greater than or equal to the predetermined threshold value W.

The plurality of parameter sets $P1, P2 \ldots Pn$ of driving situation parameters are generated by the artificial neural network K1. Alternatively, the plurality of parameter sets $P1, P2 \ldots Pn$ may be generated by a simulation, for example.

The artificial neural network K1 in the present embodiment has four hidden layers each with 128 neurons and an ELU activation function. Furthermore, a factor $\gamma$ of 0.8 is used to attenuate the function value $F1, F2 \ldots Fn$ of the further approximation steps.

Figure 2:
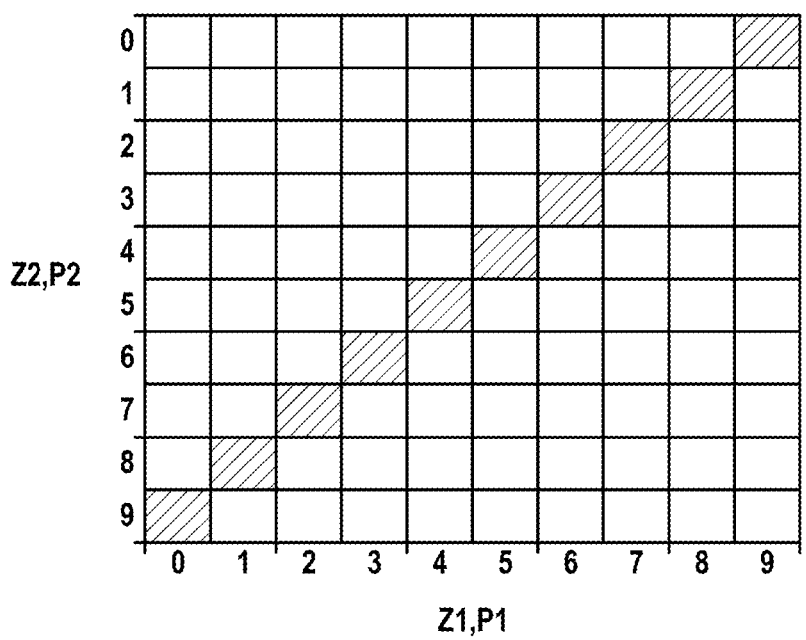
FIG. 2 is a diagram of the inventive approximation method according to an example of the invention.

FIG. 2 shows a diagram of the inventive approximation method according to the preferred embodiment of the invention.

The diagram of FIG. 2 represents a Q-learning game area consisting of 10×10 squares. The target points are in the middle of the area and are marked in black. In the context of the present Q-learning method using a neural network, in particular a DQN (Deep Q-Network), a respective target function for a given scenario to be tested or a traffic situation is approximated.

The startup position is determined randomly. Actions move the current position to a neighboring position. Accordingly, it is possible to change from one position to the upper, right, lower or left adjacent square. As a direct return, a predetermined numerical value, for example 100, is set for the target squares, and another numerical value, for example 0, is set for each other square in the game area.

In any one game, one changes from the startup position to a new position until a target position is reached. Subsequently, a new game is started from a new random startup position. The training of the neural network, which approximates the Q function, ends after a predetermined number of games, for example, 1,000 games. The value of the factor $\gamma$ for attenuating the gain is set at, for example, 0.8.

Figure 3:
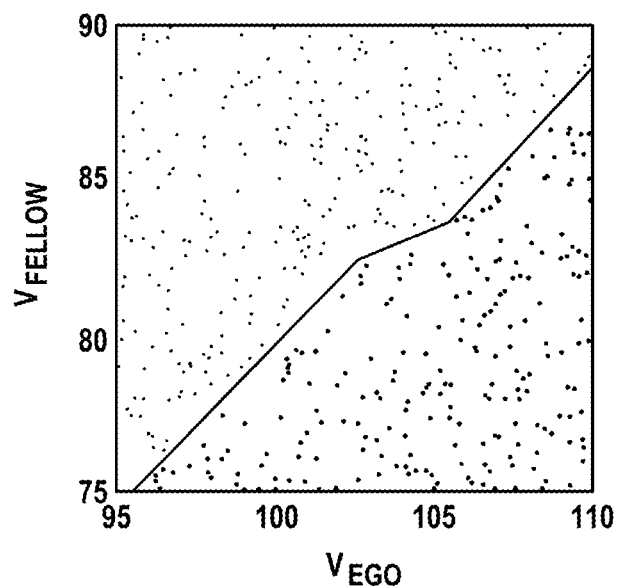
FIG. 3 is a diagram of the inventive approximation method according to an example of the invention.

FIG. 3 shows a diagram of the inventive approximation method according to the preferred embodiment of the invention.

In FIG. 3, an example of the cut-in scenario is shown using the driving situation parameters $V_{EGO}$, i.e., a speed of the EGO vehicle, and on the vertical axis $V_{FELLOW}$, i.e., the speed of the preceding FELLOW vehicle.

The function shown in FIG. 3 represents the boundary between critical and non-critical test results and is essentially the same as the target function shown in FIG. 2. The points shown are approximate test results. Alternatively, the illustrated points may be, for example, simulated test results.

The illustrated function is the safety target function, which has a numerical value which has a minimum value at a safety distance of $\geq V_{FELLOW} \times 0.55$ between the motor vehicle and the further motor vehicle, in the event of a collision between the motor vehicle and the other motor vehicle has a maximum value, and at a safety distance between the motor vehicle and the other motor vehicle has a numerical value of $\leq V_{FELLOW} \times 0.55$ which is greater than the minimum value.

As an alternative to the safety target function, for example, a comfort target function or an energy target function can be approximated, which has a numerical value having a minimum value in the event of no change in the acceleration of the motor vehicle, having a maximum value in the event of a collision between the motor vehicle and the further motor vehicle and, when the acceleration of the motor vehicle changes as a function of the amount of change in the acceleration, having a numerical value between the minimum value and the maximum value.

The plurality of driving situation parameters, in particular the $V_{EGO}$ speed of the motor vehicle and the $V_{FELLOW}$ speed of the further motor vehicle are generated within the predetermined definition range by a random algorithm. Alternatively, these can be generated for example by a simulation.

For approximating the numerical value range of each function underlying the function value, a separate artificial neural network is used. Individual hyperparameters of each artificial neural network are stored in a database.

Figure 4:
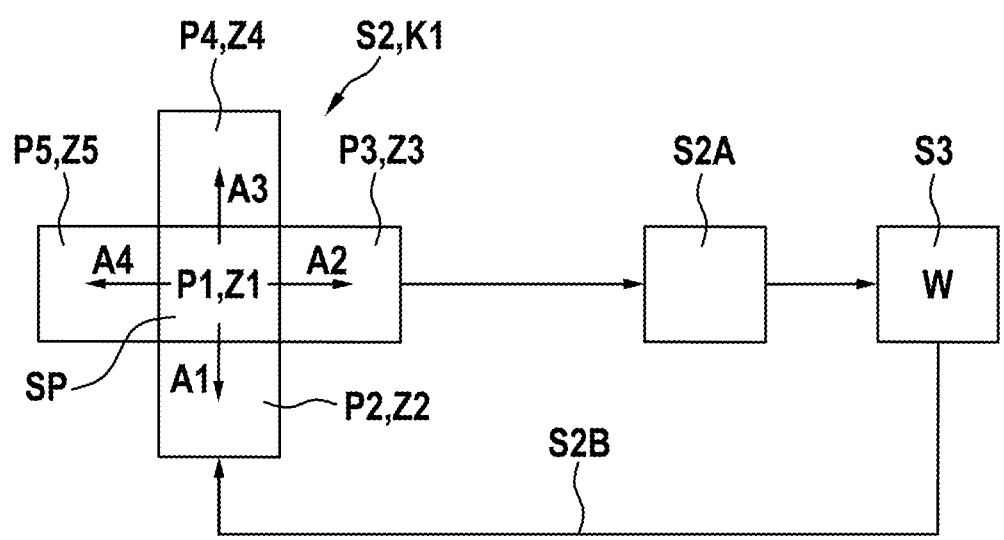
FIG. 4 is a flow chart of an inventive DQN-network according to an example of the invention.

FIG. 4 shows a flow diagram of a DQN network according to the invention according to the preferred embodiment of the invention.

From the plurality of parameter sets P1, P2 . . . Pn of the driving situation parameters, a startup parameter set SP is selected. In the approximation step S2, the function value F1, F2 . . . Fn of each neighboring startup parameter set P1, P2 . . . Pn attainable from the startup parameter set SP by an action A1, A2 . . . An is approximated by using the artificial neural network K1.

Subsequently, a selection step S2A is carried out in which the parameter set P1, P2 . . . Pn approximated in the approximation step with a lowest or highest function value F1, F2 . . . Fn is selected.

If the function value F1, F2 . . . Fn of the selected parameter set is less than the predefined threshold value W, at least one further selection step S2B is performed starting from the respectively last selected parameter set P1, P2 . . . Pn until the function value F1, F2 . . . Fn of a selected parameter set is greater than or equal to the predetermined threshold value W.

Figure 5:
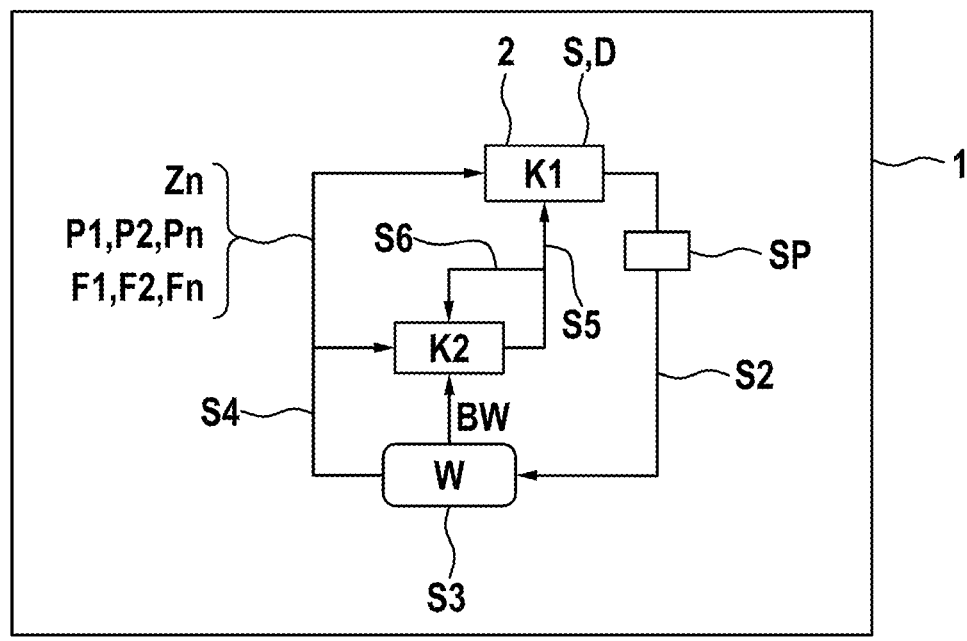
FIG. 5 is a flow chart of the method for approximating a subset of test results of a virtual test of a device for the at least partially autonomous guidance of a motor vehicle according to an example of the invention.

FIG. 5 shows a flow diagram of the method for approximating a subset of test results of a virtual test of a device for the at least partially autonomous guidance of a motor vehicle according to a further preferred embodiment of the invention.

In the present further alternative embodiment, in contrast to the Q-learning method, the Actor-Critic method or model is used. The Actor-Critic method does not require any discretization of states and actions. For the application to, for example, the cut-in scenario, the states $V_{EGO}$ and $V_{FELLOW}$ are value pairs. These are exemplified as parameter sets P1, P2 in FIG. 5.

From a certain parameter set, it is possible to transition to any other parameter set. Thus, it is not necessary to transition to a specific neighbor value pair or a neighbor parameter set, as is the case with Q-Learning. The step size is arbitrary and value pairs can be attained, which may not be attainable in Q-Learning due to the discretization.

As with Q-learning, two use cases are considered. Critical test cases are to be identified in which there is a collision or which lie at the boundary between collision and non-collision cases. For example, the safety target function serves as a reward from the environment.

From the plurality of parameter sets P1, P2 . . . Pn of the driving situation parameters, a startup parameter set SP is selected.

If the function value F1, F2 . . . Fn of the further parameter set P1, P2 . . . Pn is less than the predefined threshold value W, another artificial neural network K2 rewards the further parameter set P1, P2 . . . Pn approximated by the artificial neural network K1 and the artificial neural network K1 is adjusted based on the reward BW in step S5.

The thus adjusted artificial neural network K1 carries out at least one further approximation step S4 on the basis of the respectively last approximated further parameter set P1, P2 . . . Pn, until the function value F1, F2 . . . Fn of a further parameter set P1, P2 . . . Pn is greater than or equal to the predetermined threshold value W.

In step S6, the second artificial neural network K2 or the critic network is trained or taught. Training of the critic network is done using backpropagation. The critic network or the additional neural network K2 receives the state and the reward from the environment, which serves as the target value. Based on the target value and the actual value determined by the critic network, the error can be calculated. Subsequently, the backpropagation updates the critic network.

Figure 6:
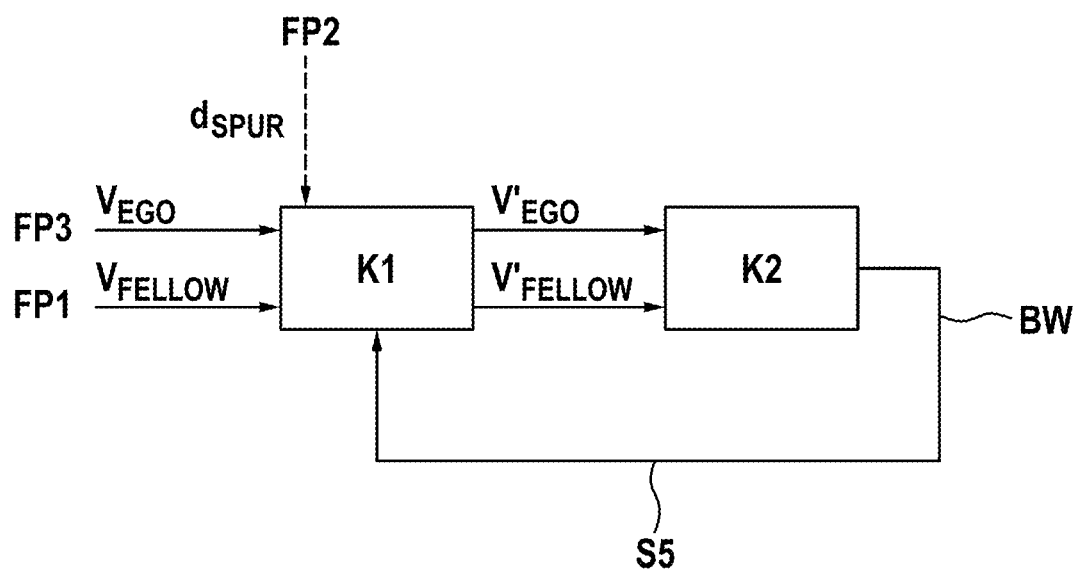
FIG. 6 is a further flow chart of the method shown in FIG. 5, according to an example of the invention.

FIG. 6 shows a further flow chart of the method shown in FIG. 5 according to the further preferred embodiment of the invention.

The artificial neural network K1 has four hidden layers each with 256 neurons and a PReLU activation function. The additional artificial neural network K2 has four hidden layers with 256 neurons each and an ELU activation function. The artificial neural network K1 and the other artificial neural network K2 apply an Adam optimization method.

The EGO parameters FP3 include a speed $V_{EGO}$ of the motor vehicle. The environmental parameters FP1, FP2 include a speed $V_{FELLOW}$ of another motor vehicle and a distance $d_{SPUR}$ between the motor vehicle and the further motor vehicle.

The artificial neural network K1 receives the value pair $V_{EGO}$ and $V_{FELLOW}$ and the distance $d_{SPUR}$ as input variables and converts the value pair $V_{EGO}$ and $V_{FELLOW}$ into a new value pair $V'_{EGO}$ and $V'_{FELLOW}$.

The additional artificial neural network K2 rewards this new value pair $V'_{EGO}$ and $V'_{FELLOW}$. By means of the reward of the further artificial neural network K2, the artificial neural network K1 is adapted.

Figure 7:
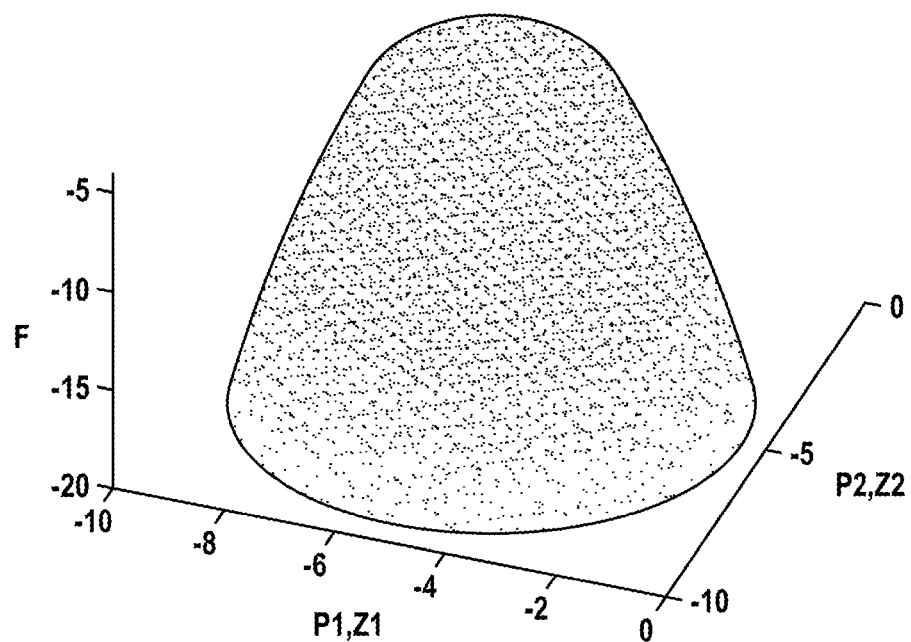
FIG. 7 is a 3-dimensional image of an inventive target function according to an example of the invention.

FIG. 7 shows a 3-dimensional image of a target function according to the invention according to the further preferred embodiment of the invention.

The function shown is a truncated cone with a constant tip. The aim of the approximation method is to attain points that lie on the cone plane. The specified parameter pairs P1, P2 are associated with a respective function to be determined. These may be, for example, the $V_{EGO}$ speed of the EGO vehicle and the $V_{FELLOW}$ speed of the FELLOW vehicle.

The further neural network K2 is already trained in advance or beforehand. The neural network or the actor network is updated on the basis of the reward of the additional neural network or of the critic network in order to attain the best possible points. The reward of the critic network is the actual value; the target value is the maximum value of the function.

For the training, similar to the Q-Learning, a random startup position is generated. The goal is to transition this startup position to the target area, the cone plane. The startup position is transitioned to the actor network. The actor network converts the startup position to a new position.

The reward of the new position by the critic network updates the actor network. The current position is then again transitioned to a new position by the actor network. This process is repeated several times. The actor network is thus updated in each step based on the reward of the critic network.

Figure 8:
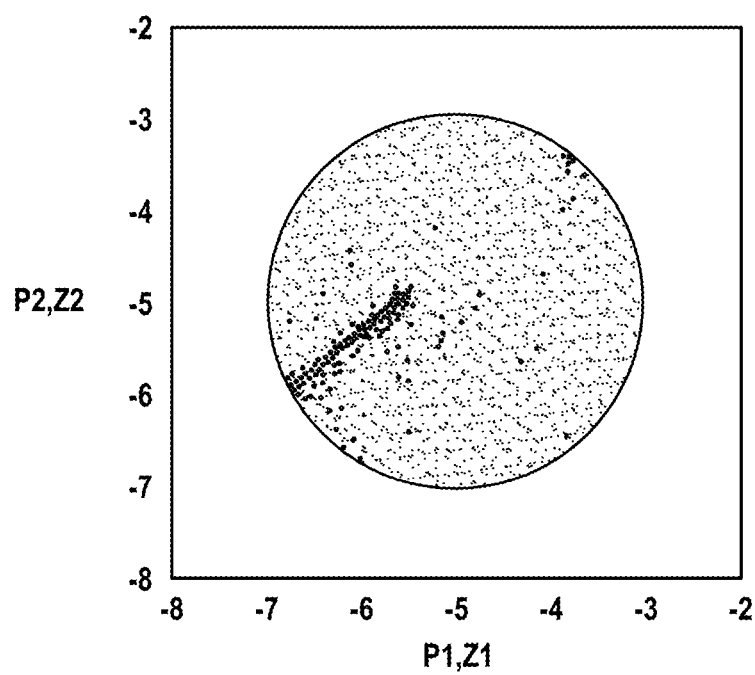
FIG. 8 is a 2-dimensional image of a cross section of the inventive target function shown in FIG. 7 according to an example of the invention.

FIG. 8 shows a 2-dimensional image of a cross section of the target function according to the invention shown in FIG. 7 according to the further preferred embodiment of the invention.

The circular area shown in FIG. 8 includes or corresponds to the target area of the function. The points shown are approximated test results, which were approximated by the method according to the invention.

Figure 9:
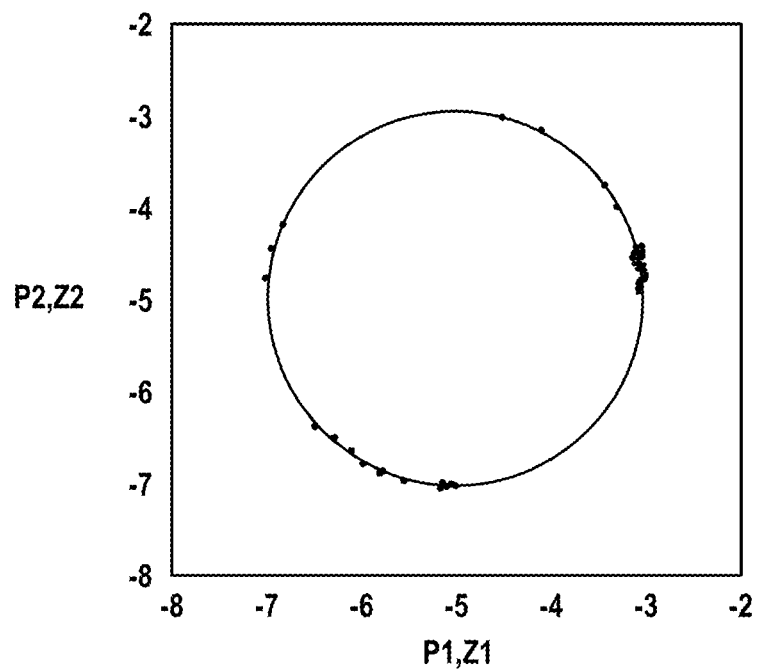
FIG. 9 is a 2-dimensional image of a cross section of the inventive target function shown in FIG. 7 according to an example of the invention.

FIG. 9 shows a 2-dimensional illustration of a cross section of the inventive target function shown in FIG. 7 according to the further preferred embodiment of the invention.

In this function, the target range is relatively narrowly defined and corresponds to an edge area of the target range shown in FIG. 8. The points lined up along the line-shaped edge area correspond to approximated test results, which were approximated by the method.

As can be seen from FIG. 9, the approximated test results lie within the stated target range and thus correspond to the subset of test results, namely the critical test results of interest.

FIGS. 1 and 5 likewise show a test unit 1 according to the invention for identifying the subset of test results of the virtual test of the device for the at least partially autonomous guidance of the motor vehicle. Said test unit comprises the corresponding component 2, for providing the data set D defining the state space Z as well as the artificial neural network K1 and/or the further artificial neural network K2.

Although specific embodiments have been illustrated and described herein, it will be understood by those skilled in the art that a variety of alternative and/or equivalent implementations exist. It should be noted that the exemplary embodiment or exemplary embodiments are only examples and are not intended to limit the scope, applicability, or configuration in any way.

Rather, the preceding summary and detailed description will provide those skilled in the art with a convenient guide to implementing at least one exemplary embodiment, wherein it is understood that various changes can be made in the scope and arrangement of the elements without departing from the scope of the appended claims and their legal equivalents.

In general, this application intends to cover modifications or variations of the embodiments set forth herein.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A computer-implemented method for approximating a subset of test results of a virtual test of a device, the method comprising:

providing a data set defining a state space, wherein each state is formed by a parameter set of driving situation parameters for which state one or more actions are feasible to attain another parameter set from the parameter set, wherein each parameter set has at least one environment parameter describing an environment of a motor vehicle and at least one EGO parameter describing a state of the motor vehicle; and performing an approximation step in which a function value of at least one further parameter set is approximated using an artificial neural network, wherein the at least one further parameter set lies within a line-shaped edge area of a target range, wherein if the function value of the approximated at least one further parameter set is greater than or equal to a predetermined threshold value, the at least one further parameter set is identified as associated with the subset of the test results, the subset representing a boundary between critical and non-critical test results, wherein if the function value of the at least one further parameter set is less than the predetermined threshold value, the artificial neural network carries out at least one further approximation step starting from the respectively last approximated further parameter set until the function value of another parameter set is greater than or equal to the predetermined threshold, and wherein the subset of the test results is used, at least partially, for an autonomous guidance of the motor vehicle.

2. The computer-implemented method according to claim 1, wherein, from the plurality of parameter sets of the driving situation parameter, a startup parameter set is selected, wherein in the approximation step, the function value of each adjacent parameter set attainable from the startup parameter sets by an action is approximated using the artificial neural network, wherein a selection step is performed in which the parameter set approximated in the approximation step with a lowest or highest function value is selected, and wherein if the function value of the selected parameter set is less than the predetermined threshold value, at least one further selection step is performed based on the respectively last selected parameter set until the function value of a selected parameter set is greater than or equal to the predetermined threshold value.

3. The computer-implemented method according to claim 1, wherein the plurality of parameter sets of driving situation parameters is generated by the artificial neural network or by a simulation.

4. The computer-implemented method according to claim 1,
wherein the artificial neural network has four hidden layers each with 128 neurons and an ELU activation function, and
wherein a factor γ of 0.8 is used for the attenuation of the function value of the further approximation steps.

5. The computer-implemented method according to claim 1,
wherein a startup parameter set is selected from the plurality of parameter sets of the driving situation parameters,
wherein if the function value of the further parameter set is less than the predetermined threshold value, another artificial neural network rewards the further parameter set approximated by the artificial neural network and the artificial neural network is adapted on the basis of the reward, and
wherein the artificial neural network adapted in this manner performs at least one further approximation step starting from the last approximated parameter set until the function value of another parameter set is greater than or equal to the predetermined threshold value.

6. The computer-implemented method according to claim 5,
wherein the artificial neural network has four hidden layers each having 256 neurons and a PRELU activation function,
wherein the further artificial neural network has four hidden layers with 256 neurons each and one ELU activation function, and
wherein the artificial neural network and the other artificial neural network apply an Adam optimization method.

7. The computer-implemented method according to claim 1, wherein the EGO parameters comprise a speed of the motor vehicle and the environmental parameters comprise a speed of another motor vehicle and a distance between the motor vehicle and the further motor vehicle.

8. The computer-implemented method according to claim 7, wherein the plurality of driving situation parameters, in particular the speed of the motor vehicle and the speed of the further motor vehicle, are generated within a predetermined definition range by a random algorithm.

9. The computer-implemented method according to claim 1, wherein the function underlying the function value is a safety target function having a numerical value which at a safety distance of $\geq V_{FELLOW} \times 0.55$ between the motor vehicle and the further motor vehicle has a minimum value, in a collision between the motor vehicle and the other motor vehicle has a maximum value, and at a safety distance of $\leq V_{FELLOW} \times 0.55$ between the motor vehicle and the other motor vehicle has a numerical value, which is greater than the minimum value.

10. The computer-implemented method according to claim 9,
wherein for approximating the numerical value range of each function underlying the function value, a separate artificial neural network is used,
wherein individual hyperparameters of each artificial neural network are stored in a database.

11. The computer-implemented method according to claim 1, wherein the function underlying the function value is a comfort target function or energy consumption target function which has a numerical value, which has a minimum value in the event of no change in the acceleration of the motor vehicle, has a maximum value in a collision between the motor vehicle and the further motor vehicle, and in a change in the acceleration of the motor vehicle, has a numerical value between the minimum value and the maximum value as a function of the amount of change in the acceleration.

12. A non-transitory computer-readable data carrier with a program code of a computer program for carrying out the method according to claim 1, when the computer program is executed on a computer.

13. A test unit for approximating a subset of test results of a virtual test of a device, the test unit comprising:
a component configured to provide a data set defining a state space, wherein each state is formed by a parameter set of driving situation parameters, for which state one or several actions are carried out in order to attain a further parameter set from the parameter set, wherein each parameter set has at least one environmental parameter describing the environment of a motor vehicle and at least one EGO parameter describing the state of the motor vehicle; and
an artificial neural network which performs an approximation step in which a function value of at least one further parameter set is approximated,
wherein the at least one further parameter set lies within a line-shaped edge area of a target range,
wherein if the function value of the approximated at least one further parameter set is greater than or equal to a predetermined threshold value, the at least one further parameter set is identifiable as associated with a subset of test results, the subset representing a boundary between critical and non-critical test results,
wherein if the function value of the at least one other parameter set is less than the predetermined threshold value, the artificial neural network is configured to perform at least one further approximation step starting from the respectively last approximated further parameter set until the function value of another parameter set is greater than or equal to the predetermined threshold value, and
wherein the subset of the test results is used, at least partially, for an autonomous guidance of the motor vehicle.

14. The test unit according to claim 13,
wherein the device is embodied by a control unit, and
wherein a driving situation underlying the approximation of the test results of the virtual test of the control unit is a lane change of another motor vehicle to a lane of the motor vehicle using the plurality of driving situation parameters.

* * * * *